3,330,028
SOLDERING FLUXES AND METHOD OF SOLDERING WITH SAME

Charles H. Elbreder, Frontenac, Mo., assignor of one-third to Arthur D. Berryman, and one-third to Gail Garner, both of Lemay, Mo.
No Drawing. Filed Oct. 17, 1963, Ser. No. 317,030
15 Claims. (Cl. 29—495)

This invention relates to soldering fluxes and more particularly to improved aluminum soldering fluxes and methods of applying a solder to aluminum.

Briefly, the invention is directed to a novel soldering flux comprising stannous chloride, zinc chloride and an anhydrous, combustible carrier therefor. The invention also includes the novel method of applying a solder to aluminum using the fluxes of the invention.

Among the several objects of the invention may be noted the provision of an improved soldering flux which is particularly useful for soldering aluminum to aluminum or aluminum to various other metals and alloys; the provision of such a soldering flux which requires no special soldering alloys to effect satisfactory soldering of aluminum to aluminum or aluminum to dissimilar metals; the provision of a soldering flux of the class described which is self-tinning and therefore may be used without a solder; the provision of a soldering flux of the type indicated which may be used at relatively low working temperatures; the provision of such a soldering flux which gives good results when used with conventional soldering techniques; and the provision of an improved method of applying a solder to aluminum utilizing a soldering flux of the invention. Other objects and features will be in part apparent and in part pointed out hereinafter.

The invention accordingly comprises the products and methods hereinafter described, the scope of the invention being indicated in the following claims.

While there are available soldering fluxes for soldering many of the commonly used metals, there has not heretofore been available a satisfactory soldering flux for the soldering of aluminum to aluminum or aluminum to various other metals and alloys. It has long been recognized that aluminum is difficult to solder, and this has somewhat limited the use of aluminum for certain commercial applications. For example, aluminum is used to some extent for guttering and spouting on homes and buildings. The joints are usually riveted and sealed with a caulking compound for want of a practical, effective and convenient means of soldering. However, in time, the caulking in the joints deteriorates and leaks develop. This is one of the reasons why aluminum has not found widespread use for gutters and drain spouts in buildings even though it is longer lasting than galvanized steel and less costly than copper for this purpose. Further, in fabricating and repairing air-conditioning equipment, such as evaporators, condensers and heat exchangers, aluminum must be bonded to copper or other dissimilar metals, and there has not heretofore been available a satisfactory soldering flux which permits aluminum to be soldered to copper by means of conventional soldering techniques.

In accordance with the present invention, it has now been found that aluminum may be readily soldered to aluminum or to any of a number of commonly used metals and alloys through the use of a soldering flux containing stannous chloride and zinc chloride incorporated in an anhydrous, combustible carrier. It will be understood that the term "aluminum" as employed herein includes aluminum and alloys of aluminum. In a preferred embodiment of the invention, the flux also contains a fluoride compound for supplying a source of fluoride ion for the purposes noted hereinafter. I have found that my novel flux enables one to readily and effectively solder aluminum to aluminum or aluminum to any of the following metals and metal alloys:

| | |
|---|---|
| Brass | Molybdenum. |
| Bronze | Monel. |
| Cadmium | Nickel. |
| Chromium | Tin. |
| Copper | Stainless Steel (various alloys). |
| Gold | Silver. |
| Iron and Steel | Zinc. |

In practice, a novel flux of my invention may be employed for soldering aluminum to aluminum or aluminum to any of the metals or alloys noted above utilizing only conventional soldering techniques and the ordinary tin-lead solders of commerce.

In formulating the flux of the present invention, care must be taken to avoid the inclusion of water since it has been found that the presence of more than approximately 1.5% by weight of water is detrimental to the performance of my fluxes. For this reason, the carrier and other components of the fluxes of the invention should be substantially anhydrous. It is permissible, however, to employ as the stannous chloride component of my fluxes either stannous chloride ($SnCl_2$) or hydrous stannous chloride ($SnCl_2 \cdot 2H_2O$), and the 1.5% by weight upper limit specified above designates the amount of water which may be included in the fluxes of the invention over and above the water of crystallization or hydration present in hydrous stannous chloride.

While any substantially anhydrous, combustible carrier may be used as the medium in which the stannous chloride and zinc chloride are incorporated, I prefer to employ as the carrier a substantially anhydrous lower aliphatic alcohol in which stannous chloride and zinc chloride are substantially soluble. Exemplary alcohols of this character which have been found satisfactory include methyl alcohol, ethyl alcohol, isopropyl alcohol and butyl alcohol. As mentioned, the lower aliphatic alcohol employed should be substantially anhydrous since it has been found that, in contact with aluminum, the presence of water in the flux has a tendency to prematurely reduce stannous chloride to metallic tin.

Although substantially anhydrous lower aliphatic alcohols constitute the preferred class of carriers for stannous chloride and zinc chloride, other substantially anhydrous, combustible media may also be used. Among such media may be mentioned petrolatum, various glycols such as polyethylene glycols, and chlorinated hydrocarbons. It is to be understood that other carriers of this type known to the art may also be used in the practice of the invention. The components of the fluxes of the invention may be incorporated in such carriers to form a paste or a slurry.

A fluoride compound may be included in the fluxes of the invention to furnish a source of fluoride ion, and when so incorporated, the fluoride compound functions to improve the flux's penetration and to remove oxide films from the surface of the aluminum being soldered. As is known, aluminum metal readily oxidizes in the atmosphere. Within a short time (e.g. 20 minutes), an invisible oxide coating may be formed on aluminum thereby rendering it difficult for solder to penetrate and wet the surface of the metal. Through the inclusion of a fluoride compound, the oxide coating on aluminum is readily penetrated and removed thereby allowing the solder to bond to the metal. For this purpose, any alkali metal fluoride such as sodium or potassium fluoride, any alkali metal bifluoride such as sodium or potassium bifluoride, ammonium fluoride, ammonium bifluoride or hydrofluoric acid may be employed.

In general, it has been found that a ratio of one part by weight of stannous chloride to four parts by weight of zinc chloride in the fluxes of the invention produces the optimum soldering results. Increasing or decreasing this ratio tends to decrease the performance of the fluxes. However, it is possible to deviate somewhat from this ratio and still achieve satisfactory results, particularly where aluminum is being soldered to a dissimilar metal. Thus, ratios of stannous chloride to zinc chloride of between 1:2 and 1:7 may be used. The preferred ratio of fluoride compound component to zinc chloride by weight is approximately 1:12, but this too may be varied somewhat without substantially impairing the performance of the flux. Thus, the ratio of fluoride compound to zinc chloride may be varied between 1:8 and 1:25.

The percentage by weight ranges within which the various components of my novel fluxes may be varied are as follows:

| Component: | Percentage by weight |
| --- | --- |
| Stannous chloride | 5–25 |
| Zinc chloride | 20–95 |
| Anhydrous, combustible carrier | 10–35 |
| Fluoride compound (when included) | 2–6 |

In formulating the fluxes of the invention, separate alcoholic solutions of the stannous chloride and zinc chloride are first prepared, approximately 10% of the anhydrous lower aliphatic alcohol being used to dissolve the stannous chloride and approximately 90% of the alcohol being used to dissolve the zinc chloride. The fluoride compound, when included in the flux, is added to a small amount of the anhydrous lower aliphatic alcohol (e.g., 0.5%) and mixed to form a slurry. The alcoholic solution of zinc chloride is then added to the alcoholic solution of stannous chloride with continuous mixing. After mixing for about 10 minutes, the alcoholic slurry of the fluoride compound is added and mixing is continued until a white creamy slurry is formed. This requires about 20 minutes. The resulting flux in slurry form is adapted to be dispensed from a suitable container, such as a plastic squeeze bottle, to a metal being soldered.

When an anhydrous, combustible carrier such as petrolatum is employed, the stannous chloride, zinc chloride and fluoride compound, such as potassium fluoride, are ground to a fine state of division. The three components are then added to molten petrolatum, and the mass is continuously mixed until cool. The resulting flux in paste form is adapted for application to a metal being soldered as, for example, from a tube.

In using the fluxes of the invention to solder aluminum to aluminum or to any of the dissimilar metals listed above, no special cleaning or surface preparation of the metal to be soldered is required except in the case of heavily anodized aluminum. Where aluminum has been chemically or electrolytically anodized, the anodized film should be removed from the surface to be soldered by mechanical means, through the use of emery cloth, sandpaper or steel wool, or by chemical means, as by treatment with 10–20% hydrofluoric acid. After thoroughly shaking the flux in slurry form, prepared as described above, the flux is applied to the metal being soldered, the the flux is activated by heating the metal or edges of the fluxed area with a torch or the like. Molten solder is then applied to the fluxed area and spreads out and flows by capillary action when the proper working temperature has been reached. After the work has been allowed to cool, the excess flux and any dirt or matter which may have been pulled from the metal is washed away with warm or hot water.

In use, the soldering fluxes of the invention may be employed to solder aluminum to aluminum or to any of the dissimilar metals and alloys noted above simply by utilizing the conventional soldering technique described above. No special solder alloys are required, and the ordinary tin-lead solders of commerce, such as the conventional 50–50 tin-lead, 60–40 tin-lead or 95–5 tin-lead solders, may be used with my fluxes to form a permanent solder joint. A novel feature of the fluxes of the invention is that they are self-tinning, and therefore may be used even without the application of solder, the aluminum being bonded solely by means of the flux and the application of heat. For example, a firm bond between brass and aluminum is formed simply by placing the two metals together and applying the flux of the invention and heat. A firm bond between the two metals is formed by the reduction of the stannous chloride in the flux to metallic tin.

It has been found that the fluxes of the invention perform equally well in soldering aluminum to aluminum or to any of the above mentioned metals. In practice, my fluxes function to deoxidize the surface to be soldered and to reduce the surface tension of the solder so that the solder effectively wets the surface of the metal being soldered and flows into the crevices and spaces by capillary action. Also, my fluxes operate well at low fluxing temperatures, with fluxing generally occurring at from 550–650° F. This working temperature is especially desirable in the soldering of aluminum inasmuch as it is substantially below the melting point of the metal and reduces warping and distortion.

The following examples illustrate the invention:

Example 1

An aluminum solder flux was prepared having the following percentage by weight composition:

| Component: | Percentage by weight |
| --- | --- |
| Stannous chloride | 14.5 |
| Zinc chloride | 57.5 |
| Sodium fluoride | 4.6 |
| Anhydrous methyl alcohol | 23.4 |
| | 100.0 |

In formulating the flux, 2.9 parts by weight of the methyl alcohol were added to the 14.5 parts by weight of stannous chloride, and the two materials were mixed until the resultant solution was clear. In a separate container, 20 parts by weight of methyl alcohol were added to the 57.5 parts by weight of zinc chloride and the two materials mixed until the resultant solution was clear. The remaining methyl alcohol (0.5%) was added to the sodium fluoride and mixed to form a slurry. The alcoholic solution of stannous chloride was then added to the alcoholic solution of zinc chloride with continuous mixing for about 10 minutes. The slurry of sodium fluoride was then added to the mixture of stannous chloride and zinc chloride with continuous mixing until a white creamy slurry was formed. This required approximately 20 minutes.

Example 2

Example 1 was repeated in preparing a soldering flux having the following percentage by weight composition:

| Component: | Percentage by weight |
| --- | --- |
| Stannous chloride | 10.0 |
| Zinc chloride | 65.0 |
| Potassium fluoride | 2.5 |
| Anhydrous methyl alcohol | 22.5 |
| | 100.0 |

Example 3

Example 1 was repeated in preparing a soldering flux having the following percentage by weight composition:

| Component: | Percentage by weight |
| --- | --- |
| Stannous chloride | 20.0 |
| Zinc chloride | 45.0 |

| Component: | Percent by weight |
|---|---|
| Ammonium bifluoride | 5.5 |
| Anhydrous isopropyl alcohol | 29.5 |
| | 100.0 |

*Example 4*

Example 1 was repeated in preparing a soldering flux having the following percentage by weight composition:

| Component: | Percentage by weight |
|---|---|
| Stannous chloride | 15.0 |
| Zinc chloride | 55.0 |
| Sodium fluoride | 5.0 |
| Anhydrous butyl alcohol | 25.0 |
| | 100.0 |

*Example 5*

Example 1 was repeated in preparing a soldering flux having the following percentage my weight composition:

| Component: | Percentage by weight |
|---|---|
| Stannous chloride | 20.0 |
| Zinc chloride | 65.0 |
| Anhydrous methyl alcohol | 15.0 |
| | 100.0 |

*Example 6*

An aluminum soldering flux was prepared having the following percentage by weight composition:

| Component: | Percentage by weight |
|---|---|
| Stannous chloride | 15.0 |
| Zinc chloride | 60.0 |
| Potassium fluoride | 5.0 |
| Petrolatum | 20.0 |
| | 100.0 |

The stannous chloride, zinc chloride and potassium fluoride were ground to a fine state of division. These three compounds were then added to molten petrolatum and mixed until the entire mass was cool.

Fluxes prepared according to the examples were used in soldering aluminum to aluminum and to the various metals and alloys listed above by conventional soldering techniques. A permanent solder joint between the metals soldered was obtained.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A soldering flux consisting essentially of stannous chloride, zinc chloride, and as a substantially anhydrous, combustible carrier therefor, a substantially anhydrous lower aliphatic alcohol in which stannous chloride and zinc chloride are substantially soluble, the ratio of stannous chloride to zinc chloride being between 1:2 and 1:7.

2. A soldering flux consisting essentially of chloride, zinc chloride, a fluoride compound selected from the group consisting of alkali metal fluorides, alkali metal bifluorides, ammonium fluoride, ammonium bifluoride, and hydrofluoric acid, and as a substantially anhydrous, combustible carrier therefor, a substantially anhydrous lower aliphatic alcohol in which stannous chloride and zinc chloride are substantially soluble, the ratio of stannous chloride to zinc chloride being between 1:2 and 1:7 and the ratio of fluoride compound to zinc chloride being between 1:8 and 1:25.

3. A soldering flux consisting essentially of from approximately 5 to 25% by weight of stannous chloride, from approximately 20 to 95% by weight of zinc chloride and from approximately 10 to 35% by weight of a substantially anhydrous, combustible carrier for the stannous chloride and zinc chloride.

4. A soldering flux consisting essentially of from approximately 5 to 25% by weight of stannous chloride, approximately 20 to 35% by weight of zinc chloride and from approximately 10 to 35% by weight of a substantially anhydrous, combustible carrier for the stannous chloride and zinc chloride, said carrier being a substantially anhydrous lower aliphatic alcohol selected from the group consisting of methyl alcohol, ethyl alcohol, isopropyl alcohol and butyl alcohol.

5. A soldering flux consisting essentially of from approximately 20 to 95% by weight of zinc chloride, from approximately 2 to 6% by weight of a fluoride compound selected from the group consisting of alkali metal fluorides, alkali metal bifluorides, ammonium fluoride, ammonium bifluoride and hydrofluoric acid, and from approximately 10 to 35% by weight of a substantially anhydrous, combustible carrier for the stannous chloride and zinc chloride, said carrier being a substantially anhydrous, lower aliphatic alcohol selected from the group consisting of methyl alcohol, ethyl alcohol, isopropyl alcohol and butyl alcohol.

6. A soldering flux consisting essentially of approximately 14.5% by weight of stannous chloride, approximately 57.5% by weight of zinc chloride, approximately 4.6% by weight of sodium fluoride and approximately 23.4% by weight of anhydrous methyl alcohol.

7. A soldering flux consisting essentially of approximately 10% by weight of stannous chloride, approximately 65% by weight of zinc chloride, approximately 25% by weight of potassium fluoride and approximately 22.5% by weight of anhydrous methyl alcohol.

8. A soldering flux consisting essentially of approximately 20% by weight of stannous chloride, approximately 45% by weight of zinc chloride, approximately 5.5% by weight of ammonium bifluoride and approximately 29.5% by weight of anhydrous isopropyl alcohol.

9. A soldering flux consisting essentially of approximately 15% by weight of stannous chloride, approximately 55% by weight of zinc chloride, approximately 5% by weight of sodium fluoride and approximately 25% by weight of anhydrous butyl alcohol.

10. A soldering flux consisting essentially of approximately 20% by weight of stannous chloride, approximately 65% by weight of zinc chloride and approximately 15% by weight of anhydrous methyl alcohol.

11. A soldering flux consisting essentially of approximately 15% by weight of stannous chloride, approximately 60% by weight of zinc chloride, approximately 5% by weight of potassium fluoride, and approximately 20% by weight of petrolatum.

12. The method of applying a solder to a metal comprising the steps of applying a flux to the surface of the metal being soldered, activating the flux and applying molten solder to the flux coated surface of the metal, said flux consisting essentially of stannous chloride, zinc chloride, and as a substantially anhydrous, combustible carrier therefor, a substantially anhydrous lower aliphatic alcohol in which stannous chloride and zinc chloride are substantially soluble, the ratio of stannous chloride to zinc chloride being between 1:2 and 1:7.

13. The method of applying a solder to a metal comprising the steps of applying a flux to the surface of the metal being soldered, activating the flux at a temperature between approximately 550 and 650° F., and applying molten solder to the flux coated surface of the metal, said flux consisting essentially of stannous chloride, zinc chloride, a fluoride compound selected from the group consisting of alkali metal fluorides, alkali metal bifluorides, ammonium fluoride, ammonium bifluoride, and hydrofluoric acid, and as a substantially anhydrous, combustible carrier therefor, a substantially anhydrous lower aliphatic alcohol in which stannous chloride and zinc chloride are substantially soluble, the ratio of stannous chloride to zinc chloride being between 1:2 and 1:7 and the ratio of fluoride compound to zinc chloride being between 1:8 and 1:25.

14. The method of applying a solder to a metal comprising the steps of applying a flux to the surface of the metal being soldered, activating the flux at a temperature between approximately 550 and 650° F., and applying molten solder to the flux coated surface of the metal, said flux consisting essentially of from approximately 5 to 25% by weight of stannous chloride, from approximately 20 to 95% by weight of zinc chloride and from approximately 10 to 35% by weight of a substantially anhydrous, combustible carrier for the stannous chloride and zinc chloride.

15. The method of applying a solder to a metal comprising the steps of applying a flux to the surface of the metal being soldered, activating the flux at a temperature between approximately 550 and 650° F., and applying molten solder to the flux coated surface of the metal, said flux consisting essentially of from approximately 5 to 25% by weight of stannous chloride, from approximately 20 to 95% by weight of zinc chloride, from approximately 2 to 6% by weight of a fluoride compound selected from the group consisting of alkali metal fluorides, alkali metal bifluorides, ammonium fluoride, ammonium bifluoride and hydrofluoric acid, and from approximately 10 to 35% by weight of a substantially anhydrous, combustible carrier for the stannous chloride and zinc chloride, said carrier being a substantially anhydrous, lower aliphatic alcohol selected from the group consisting of methyl alcohol, ethyl alcohol, isopropyl alcohol and butyl alcohol.

References Cited

UNITED STATES PATENTS

| | | | |
|---|---|---|---|
| 648,831 | 5/1900 | Bates | 148—26 |
| 2,801,943 | 8/1957 | Freedman | 148—23 |
| 2,867,037 | 1/1959 | Lawton | 29—495 |
| 2,875,514 | 3/1959 | Doerr | 148—26 |
| 3,074,158 | 1/1963 | Finnegan | 148—26 |

JOHN F. CAMPBELL, *Primary Examiner.*

L. J. WESTFALL, *Assistant Examiner.*